United States Patent [19]

Stübbe

[11] Patent Number: 4,819,731
[45] Date of Patent: Apr. 11, 1989

[54] HORSESHOE AND METHOD OF APPLYING SAME

[76] Inventor: Peter Stübbe, Schenkenberger Weg 17, 2061 Bliestorf, Fed. Rep. of Germany

[21] Appl. No.: 67,404

[22] Filed: Jun. 29, 1987

Related U.S. Application Data

[63] Continuation of Ser. No. 789,180, Oct. 18, 1985, abandoned.

[30] Foreign Application Priority Data

Nov. 13, 1984 [DE] Fed. Rep. of Germany ....... 3441417

[51] Int. Cl.[4] .................. A01L 3/00; A01L 7/02
[52] U.S. Cl. ........................ 168/4; 168/12; 168/14
[58] Field of Search .......... 168/1, 2, 4, 11–14, 168/18, 20, 26, 28

[56] References Cited

U.S. PATENT DOCUMENTS

| 177,991 | 5/1876 | Cook | 54/82 |
|---|---|---|---|
| 592,261 | 10/1897 | Stephens | 168/28 |
| 691,361 | 2/1899 | Stephens | 168/28 |
| 840,892 | 1/1907 | Adam | 168/1 |
| 1,043,978 | 11/1912 | St. John | 168/2 |
| 1,083,968 | 1/1914 | Whitaker | 168/1 |
| 1,095,787 | 5/1914 | Blackman | 168/1 |
| 1,100,487 | 6/1914 | Molnár | 168/20 |
| 1,212,266 | 1/1917 | Schrader | 168/28 |
| 1,442,748 | 1/1923 | Trauger | 168/28 |
| 1,453,905 | 5/1923 | Blackman | 168/28 |
| 3,302,723 | 2/1967 | Renkenberger et al. | 168/4 |
| 3,486,561 | 12/1969 | Kulak | 54/82 |
| 3,519,079 | 7/1970 | Bieber | 168/20 |
| 3,599,720 | 8/1971 | Mathern | 168/4 |
| 3,747,684 | 7/1973 | Wallen | 168/26 |
| 4,237,981 | 12/1980 | Stübbe | 168/4 |
| 4,420,046 | 12/1983 | Choplin | 168/26 |

FOREIGN PATENT DOCUMENTS 480585  8/1916  France ..................... 168/1

Primary Examiner—Robert Peshock
Assistant Examiner—J. Hakomaki
Attorney, Agent, or Firm—Walter C. Farley

[57] ABSTRACT

A horseshoe includes a resiliently flexible metal frame which is attached to the outer surface of the hoof by flaps adhered to the surface and is releasably connected by projections to an elastic sole member which is prefabricated in the peripheral shape of the hoof.

12 Claims, 6 Drawing Sheets

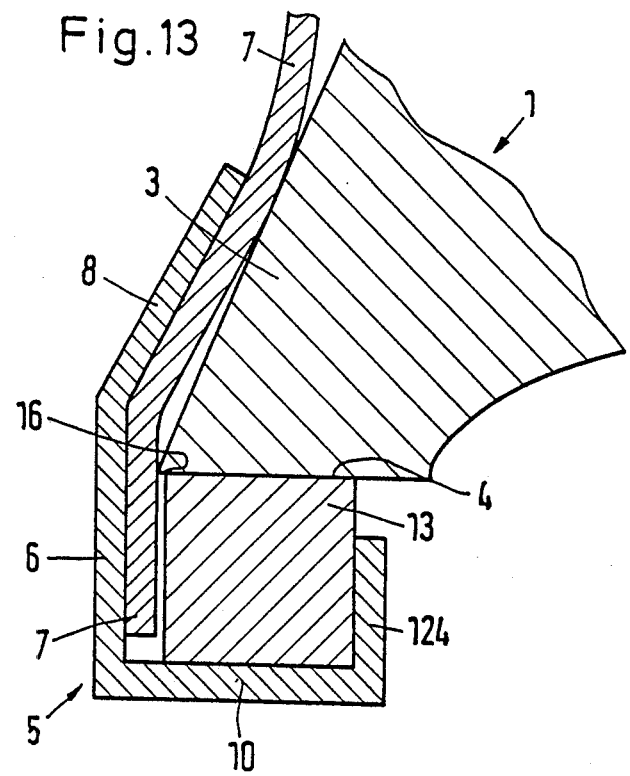

HORSESHOE AND METHOD OF APPLYING SAME

CROSS REFERENCE TO RELATED APPLICATION

This is a continuation of application Ser. No. 789,180, filed Oct. 18, 1985, and now abandoned.

This invention relates to a horseshoe of the type which encompasses the lower portion of the horse's hoof and to a method of forming and applying such a horseshoe.

BACKGROUND OF THE INVENTION

Horseshoes of the general type to which the invention relates are characterized by extremely simple application to the hoof during which the horseshoe is merely secured to the external surface of the hoof by adhesive. The shoe can be removed by disengaging the adhesive connection and subsequently applied again. The structure provides elasticity both in the vertical direction and in peripheral directions, thereby protecting the horseshoe and the hoof from very strong impact loads which can occur, for example, on hard ground or pavement, and permits the necessary spreading movements of the hoof when running which insures its health.

A horseshoe of the general type referred to above is disclosed in U.S. Pat. No. 4,237,981, Stubbe, issued Dec. 9, 1980. In the structure shown in that patent, a frame is formed and is connected to the sole of the hoof by a sole material which is cast onto the metal frame. This construction technique is expensive and time consuming. The metal profile must first be pre-bent into the hoof shape to match the individual hoof and the sole material must then be poured into a hoof mold. These steps can only be performed in a factory environment. Thus, a hoof print must be taken and sent to the factory where the horseshoe is produced. These steps are clearly time consuming and expensive.

SUMMARY OF THE INVENTION

An object of the present invention is to provide an improved horseshoe of the general type discussed above which can be produced more quickly, simply and economically.

A further object is to provide a method of applying a horseshoe which is simple and efficient.

In one aspect, the invention comprises a horseshoe having a formable frame with an upstanding outer wall and laterally, inwardly extending support surface segments, the frame being bendable into a U-shape to conform to the peripheral shape of the sole of a horse's hoof with the outer wall partially surrounding the hoof and with the support segments lying beneath the hoof. A preformed sole member is cut from a plate of polymeric material, the periphery of the sole member being shaped to match the peripheral shape of the sole of the hoof. A plurality of attachment means are connected to the outer wall and are adherable to the hoof for securing the frame to the hoof. A plurality of projections extend into the sole member and are fixedly attached to the support segments to attach the sole member to the frame within the outer wall so that the sole of the hoof rests on the sole member within the outer wall, the upper edge of the wall being above the upper surface of the sole member.

In another aspect, the invention comprises a method of forming and applying a horseshoe comprising the steps of providing an elongated section of interconnected, unitarily formed frame segments each of which has an upstanding wall portion and a support portion forming an L shape, and a length of flexible material attached to and expending upwardly from the wall portion. A selected number of frame segments, still connected, are cut from the section so that the length of the segments is substantially equal to the periphery of the front and side portions of the hoof of a horse. The connected segments are bent to form a frame which substantially conforms to the hoof periphery with the support portions extending inwardly beneath the hoof. A plate of substantially rigid polymeric material is supplied and a sole member is cut from that plate, the sole member having a peripheral shape which substantially matches the shape of the sole of the hoof. The sole member is placed in the frame and the hoof is then placed in the frame on the sole member, after which the lengths of flexible material are adhered to the front and side surfaces of the hoof above the frame.

Preferably, each support portion includes an upward projection which extends into the sole member to inhibit lateral relative movement.

BRIEF DESCRIPTION OF THE DRAWINGS

In order to impart full understanding of the manner in which these and other objects are attained in accordance with the invention, particularly advantageous embodiments thereof will be described with reference to the accompanying drawings, which form a part of this specification, and wherein:

FIG. 13 is a partial side elevation, in section, of a further embodiment of a horseshoe in accordance with the invention.

DESCRIPTION OF THE PREFERRED EMBODIMENTS

Figure 1:
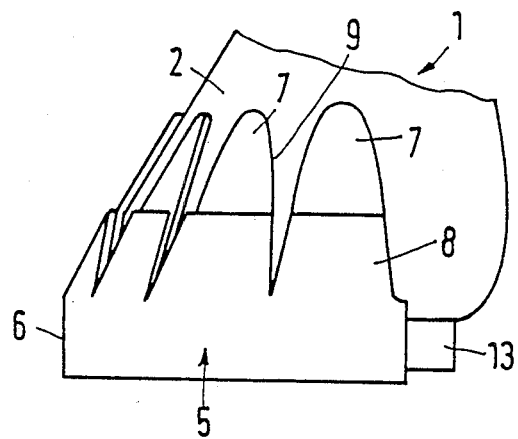
FIG. 1 is a side elevation of a horseshoe in accordance with the invention secured to a hoof.
Figure 4:
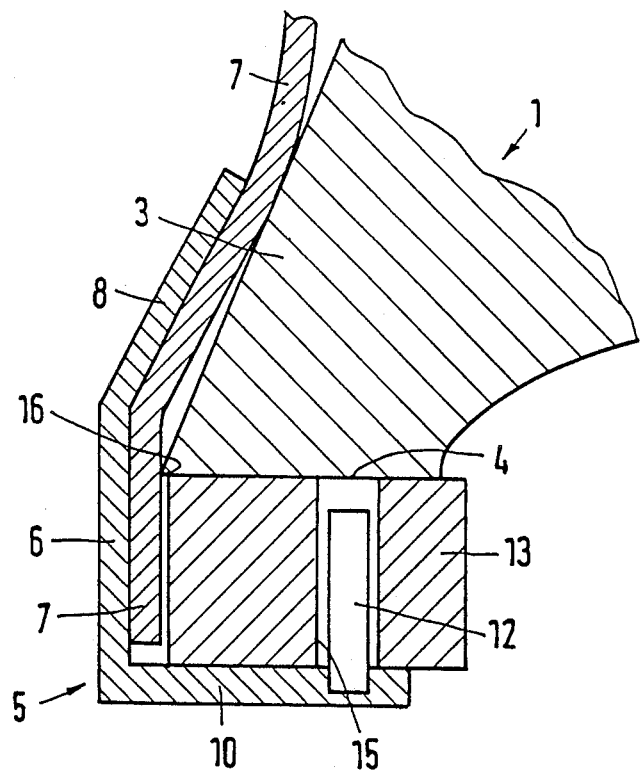
FIG. 4 is a side elevation in section along line IV—IV of FIG. 2.

FIG. 1 shows a portion of a horse's hoofs indicated generally at 1 which has an outer surface 2 of a generally conical shape, enlarging from the top downwardly in the characteristic manner. FIG. 4 shows a sectional view including a portion of the hoof 1 from which it can be seen that the edge part of the hoof has a peripheral horny wall 3 with a supporting standing surface 4 which is generally U-shaped, or horseshoe shaped, and that the inner portion of the bottom of the hoof is somewhat concave or domed.

A horseshoe in accordance with the invention is shown in FIG. 1 fastened in position on the hoof. The horseshoe has a peripheral metal frame which has a vertical or upstanding exterior wall 6, also seen in FIG. 4. Wall 6, as viewed in plan, extends in a horseshoe shape around the hoof, following the exterior shape of the hoof, and extends above the bottom surface 4 of the hoof, as seen in FIG. 1, so that the lower edge of the hoof is surrounded by the exterior wall 6. In this manner, the horseshoe is firmly retained in the lateral direction on the hoof by the metal wall of the horseshoe which is very stiff but slightly resiliently flexible. Attachment means for securing the horseshoe in the vertical direction comprises a plurality of flaps or tabs 7 which are fixedly attached to the inner surface of metal wall 6, as shown in FIG. 4. The connection to the inner surface of wall 6 can be accomplished by gluing or by vulcanizing. The tabs 7, shown in FIG. 4 partially lifted away from the external surface 2 of the hoof, are secured to that external surface with, for example, a very quick setting adhesive for the purpose of restraining the horseshoe against dropping off.

At the upper edge of exterior wall 6 are a plurality of upwardly protruding projections 8 which are formed as upwardly extending portions of the wall itself in registry with flaps 7. Projections 8 initially constitute extensions of the exterior wall 6, i.e., they extend vertically upwardly, and after the horseshoe is secured to the hoof, projections 8 are caused to conform somewhat to the exterior shape of the hoof by hammering them inwardly prior to adhering the flaps 7. Thus, projections 8 constitute an additional retaining means. Between the individual flaps 7 and projections 8 are formed slots 9 which widen upwardly and are provided so that the flaps 7 and projections 8 can adapt to the conical shape of the external surface 2 of the hoof.

Figure 2:
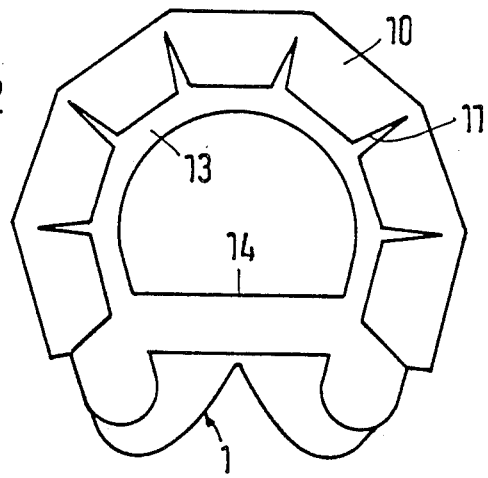
FIG. 2 is a bottom plan view of the structure of FIG. 1.

The frame further includes bearing surface segments 10 which extend inwardly from the lower edge of wall 6 in a perpendicular fashion forming an L-shaped arrangement. By "inwardly", it is meant that, when the frame is formed around the hoof, segments 10 extend beneath the hoof toward the interior of the sole, the segments being formed integrally with metal wall 6 as an angled structure. Segments 10 are separated from each other by generally triangular slots 11 as seen in FIG. 2. Slots 11 partially close when the metal frame structure is bent into the horseshoe shape.

Figure 3:
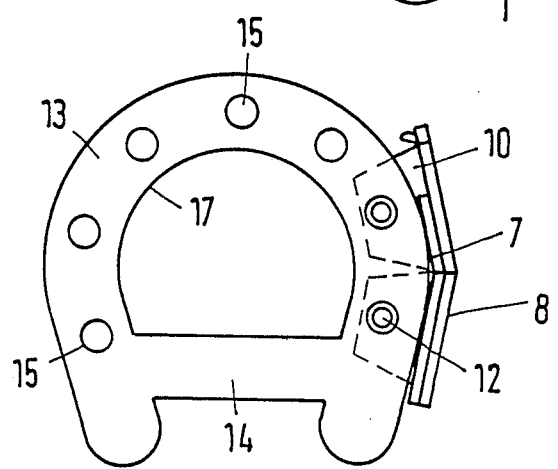
FIG. 3 is a top plan view of a sole member and a portion of the frame of the construction of FIGS. 1 and 2.
Figure 5:
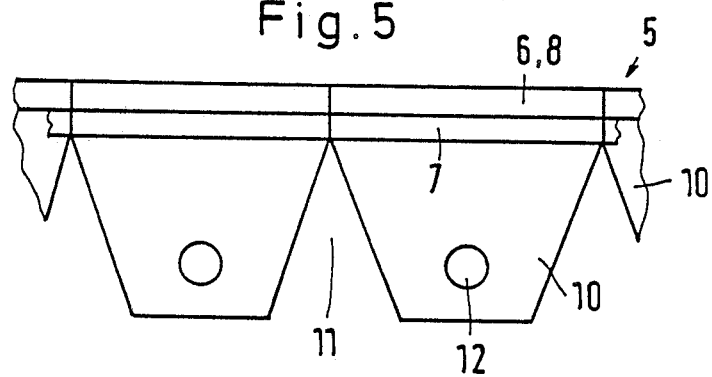
FIG. 5 is a top plan view of the metal frame material before forming into a horseshoe.

In the embodiment shown in FIGS. 3–5, the bearing surface segments 10 are provided with pegs 12 which extend vertically upwardly parallel with exterior wall 6 as seen in FIG. 4. The pegs are connected in any desired manner to segments 10, the pegs being set into recesses in the segments in the embodiments of FIG. 4.

The horseshoe structure includes a sole member 13 which is shown in plan view in FIG. 3. The sole is constructed nearly annularly, in the general shape of a horseshoe, and is closed near the rear end with an integral web or bar 14 which is formed from the same material as the remainder of the sole member. The sole member and bar are formed from a relatively rigid but somewhat elastic polymeric material such as polyurethane. The bar 14 restrains the open end of the horseshoe shape from spreading apart which could lead to tearing away of the horseshoe. Sole member 13 is provided with vertical bores 15 which are located at the positions of pegs 12. When the sole 13 is placed from above onto bearing surface segments 10, pegs 12 enter bores 15 and ensure firm interlocking engagement of the metal frame 5 with the sole member 13 in the transverse direction, parallel with the plane of the sole. This assembled construction can be seen in FIG. 4. As seen in FIG. 4, the bottom surface 4 of the hoof sole stands on sole member 13. The sole member engages the upper surfaces of bearing surface segments 10 which are interconnected by exterior wall 6 and attached to the external surface 2 of the hoof through flaps 7. Sole member 13 is thus reliably retained in the vertical direction between segments 10 and the sole of hoof 1. Together with the interlocking engagement of pegs 12 in openings 15, a connection between the sole member 13 and the metal frame 5 is produced which is secure in all directions.

FIG. 5 is a plan view of a metal frame structure 5 in a straight configuration, as yet unbent. The prefabricated flaps 7 have already been applied to the interior surface of exterior wall 6 together with projections 8. The pegs 12 are secured to the bearing surface segments 10. A structure as shown in FIG. 5 can be prefabricated in an elongated form of substantially indefinite length. It is a simple matter to provide a length having a large number of segments, suitable for making a substantial number of individual horseshoes. In the illustrated horseshoe, a section having seven bearing surface segments is cut from the longer length. The method of forming and applying a horseshoe in accordance with the invention and having the precise dimensions which must necessarily be maintained to match those of the individual hoof 1 is very simple.

First, the hoof is cleaned, its sole surface 4 can be smoothed, and that surface is then placed on a piece of material such as, for example, cardboard. A line is drawn on the cardboard around the outer edge 16 of the hoof.

A sole member 13 is then cut out of a plastic plate of a suitable material and a suitable thickness in the shape seen in FIG. 3, following the line corresponding to the edge 16. The thickness of the plastic plate and the resulting sole member is preferably between about 10 mm and about 20 mm. A suitable material for this purpose is a polyurethane produced by Bayer AG and sold under the trademark Vulkolan 2000.

A section of the metal frame material with (for purposes of the present illustration) seven bearing surface segments 10 is also bent along the line drawn on the cardboard into the shape seen in FIG. 2 and corresponding to the shape of hoof edge 16. The sole member 13 is then placed from above onto pegs 12 and the positions of the pegs are marked. This can be accomplished by simply pressing or lightly hammering the sole member onto the pegs. Bores 15 of suitable diameter are then formed at the marked positions and the sole member can then be placed in interlocking engagement onto the metal frame. The configuration which is shown in plan view in FIG. 3 is thus produced, only a small portion of the metal frame being shown in that figure.

The manufacture of the horseshoe in accordance with the invention can be substantially simplified and made cheaper. Sole member blanks can be prefabricated in a factory in a plurality of commonly used sizes. A blank of appropriate size is then selected for a certain hoof and only slightly modified to conform to the individual sole shape of that hoof. The cutting work is thus reduced and the waste from the cutting operation is also reduced. Such sole blanks can be produced with the basic shape shown in FIG. 3 with the external shape slightly larger so that it can be cut down to suit the individual situation.

In order to determine what cutting is necessary, the hoof of the horse can be placed directly on the sole member blank and the outline drawn thereon, further simplifying the process. In order to avoid slipping while drawing the line, the plate or blank can be temporarily secured by adhesive to the bottom of the hoof by means, for example, of an adhesive foil which is easily releasable.

The bending of the metal frame material into the desired individual hoof shape is accomplished most simply by bending the prefabricated metal frame material, provided in straight form, around the sole member 13 which has already been cut to size. The sole member is thus used as a pattern for bending the metal material. This considerably facilitates bending the metal into the proper shape.

When bending the metal frame material it is advantageous that it be bent portion by portion, i.e., so that individual ones of triangular slots 11 are sequentially and successively made smaller by bending. This is best effected by gripping two adjacent projections 12 with pliers and pressing them together. Experiments have shown that the metal profile 5 can be precisely matched in this fashion to the prefabricated sole 13 very simply and rapidly.

The structure which is thus obtained is placed beneath the hoof. Projections 8 are matched to the shape of the external surface 2 of the hoof with a hammer and lugs 7 are glued to it.

The gluing of the lugs 7 to the external surface 2 of the hoof is accomplished in a very simple manner by applying a drop of an adhesive which sets very rapidly and is, for example, commercially availble as an instant glue of a cyanoacrylate type marketed by Sichelwerke GmbH under the trademark Sicomet 99. Similar adhesives are also commercially available under other trademarks. The adhered points which are thus formed ensure a firm connection of flaps 7 to surface 2 of the hoof and retain the horseshoe structure in the vertical direction.

Thus, in this manner, an individually shaped horseshoe structure is obtained with very simple means and relatively few hand operations and has excellent retaining and support characteristics.

The structure in accordance with the invention can be substantially varied from the previously illustrated embodiment.

For example, the sole member 13 can be constructed as a continuous plate which is cut to size only around its outer edge to correspond to the periphery of hoof edge 16. The illustrated annular construction with its open interior and bar 14 is, however, preferred for reasons relating to the yygiene of the hoof.

The interlocking connection of sole 13 with metal frame 5 which is provided by the engagement of projections 12 with openings 15 is of considerable importance to the horseshoe in accordance with the invention. The specific interlocking engagement can, however, be varied in many ways.

Figure 6:
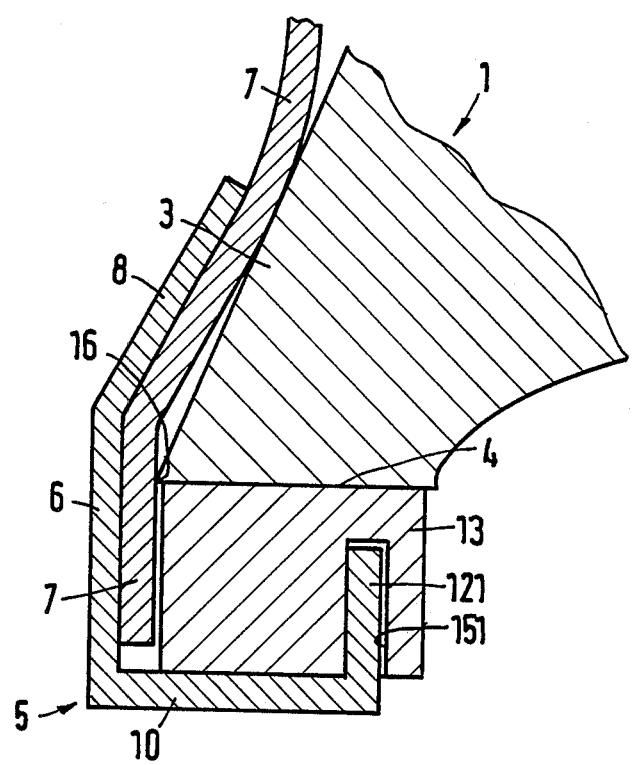
FIG. 6 is a partial side elevation, in section, of a further embodiment of a horseshoe in accordance with the invention.
Figure 7:
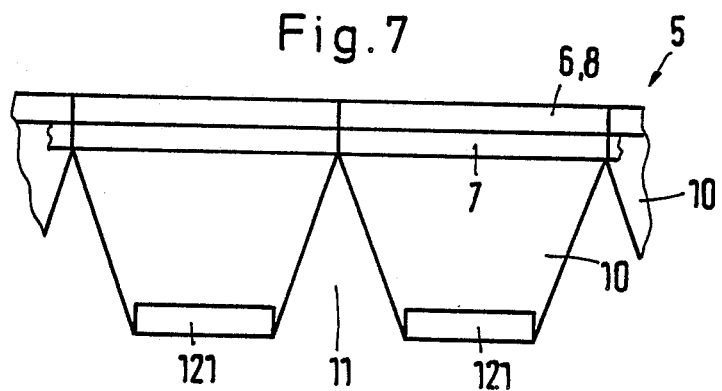
FIG. 7 is a top plan view of a portion of frame material usable to form the embodiment of FIG. 6.

One variation is illustrated in FIGS. 6 and 7 in which projections 121 are provided as lugs integrally formed with bearing surface segments 10, the lugs being bent upwardly at right angles to the support segments. These projections 121 also engage in recesses 151 in the sole member 13 in a manner similar to the embodiment of FIG. 4. However, recesses 151 are closed at the top in this example and are not fully open at the top as are the bores of FIG. 4.

Figure 8:
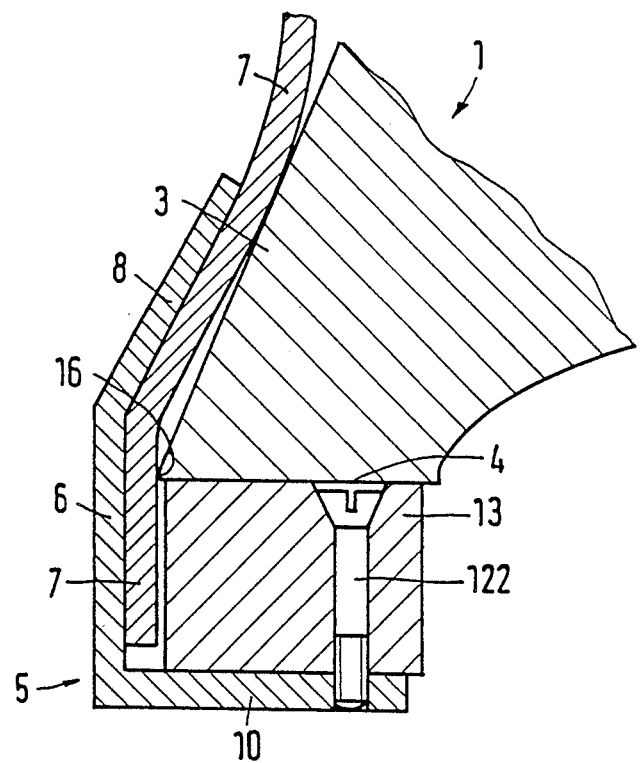
FIG. 8 is a partial side elevation, in section, of yet another embodiment of a horseshoe in accordance with the invention.
Figure 9:
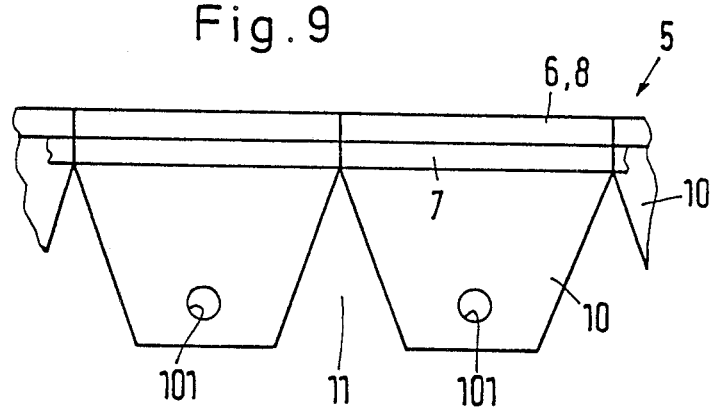
FIG. 9 is a top plan view of a portion of frame material usable to form the embodiment of FIG. 8.

A further example is shown in FIGS. 8 and 9. This embodiment is quite similar to that of FIGS. 4 and 5. However, the pegs 12 are replaced by screws 122 which have a lower threaded end portion screwed into threaded holes 101 provided in segments 10. Screws 122 can be inserted in prepared bores in sole member 13 or they may, for example, have self-cutting tips and simply be threaded through the unprepared sole material.

Figure 10:
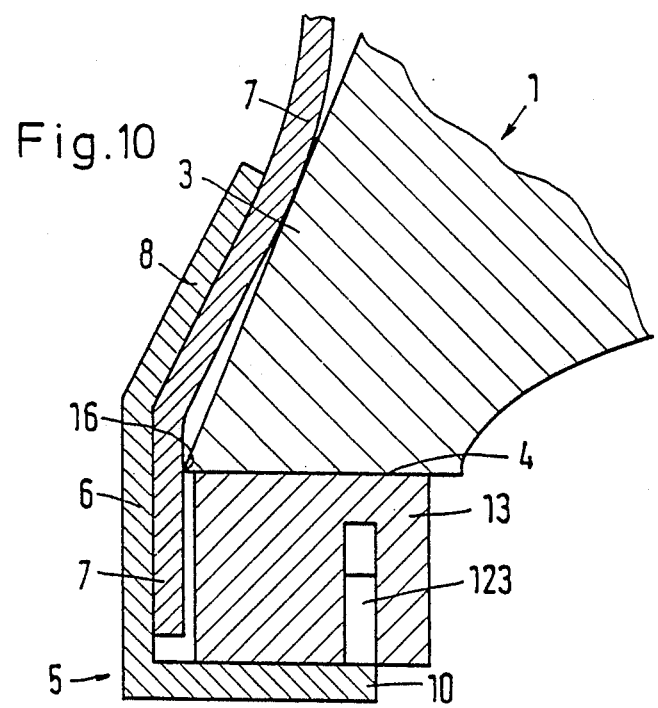
FIG. 10 is a side elevation of a further embodiment of a horseshoe in accordance with the invention.
Figure 11:
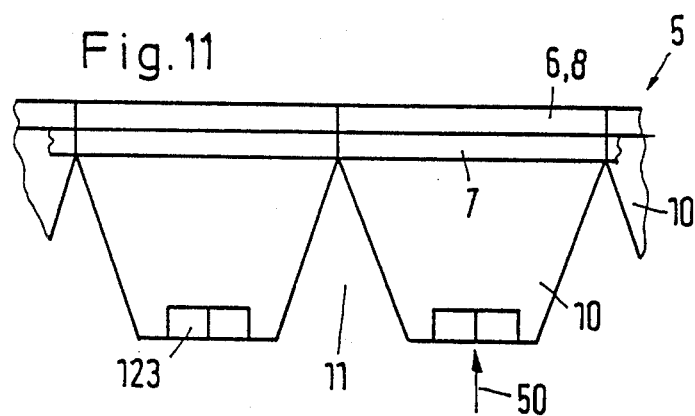
FIGS. 11 and 12 are top plan and side elevation views of frame material usable to form the horseshoe of FIG. 10.
Figure 12:
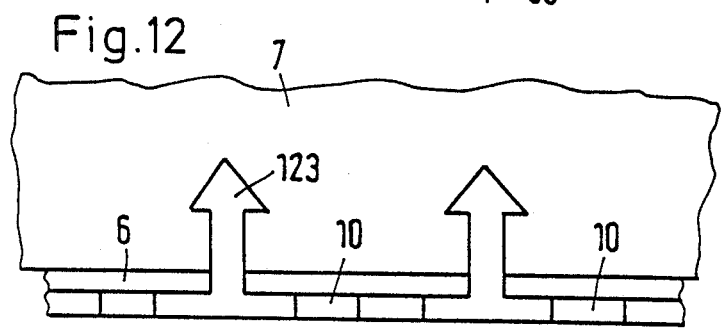

A further variation is illustrated in FIGS. 10 and 11 which are, again, quite similar to that of FIGS. 4 and 5 except for the projections. FIG. 12 shows a view in the direction of arrow 50 of FIG. 11. As can be seen from FIGS. 10–12, the projections 123 in this embodiment are integrally and unitarily formed with the bearing surface segments 10, as in the embodiment of FIGS. 6 and 7, the ends of the segments being bent upwardly at right angles.

The projections 123 are, however, not formed as right angled plates as were the projections 121 in FIGS. 6 and 7, but are constructed as upstanding members with arrow-like pointed ends and a narrow shaft, thus leaving an arrow tip with two lateral barbs at the upper end. When mounting sole member 13 on the metal frame 5 in this embodiment, the sole is placed from above onto the tips of the pointed projections 123 and pressed or hammered downwardly. The arrows cut into the material of sole member 13 which need not be predrilled.

This embodiment has the advantage that no recesses need be preformed in the sole, and the further advantage that the sole is connected to the metal frame in a way that it cannot be readily removed because of the barbs at the narrow tips of the projections, this embodiment being particularly advantageous for assembly purposes.

A further variation is shown in FIG. 13 wherein the projections 124 are constructed in a manner corresponding to those of FIGS. 6 and 7 and constitute, for example, rectangular plates which are integrally formed at the ends of the bearing surface segments 10. In distinction from the embodiment of FIGS. 6 and 7, the material of sole member 13 does not surround projections 124 but is only interlockingly retained in an interior space formed between exterior wall 6 and projections 124. This embodiment is relatively simple and certain advantages result, particularly during assembly, since projections 124 need not be laboriously fitted into prepared recesses in the sole. However, disadvantages can result in the embodiment of FIG. 13 in that sole member 13 and the U-shaped frame 5 can move relative to one another in the peripheral direction, i.e., the direction perpendicular to the plane of the drawing which can be thought of as a relative circular movement, whereby the shape of the sole can alter.

In the embodiments shown, the horseshoe is retained on the hoof in the vertical direction by adhering flaps 7 to surface 2 of the hoof. However, other means can be used to retain the shoe in this direction such as, for example, readily releasable button connections or the like as shown in German patent documents Nos. P34 24 726.2 and P34 06 733.7.

It is also possible to omit projections 8. The bearing surface segments 10 are constructed, as shown in FIG. 5, to taper away from external wall 6 in order to facilitate the bending and closing of triangular slots 11 into the shape of the hoof. The bearing surface segments 10 can, however, have different shapes such as rectangular in plan in which case they are secured to external wall 6 in spaced relationship from each other.

From the above direction, it will be seen that the structure in accordance with the invention includes a sole which is cut to size from a semi-finished product in a shape matching the individual peripheral shape of the horse's hoof. The connection of the sole with the metal frame is accomplished by mounting the sole member on projections. In this manner, an interlocking connection in the plane of the sole between these two parts is created which can be simply produced and also simply disengaged. The casting process which was necessary in the construction of the prior art is not required. The manufacture is thus considerably simpler. After the sole has been cut to size with the matching peripheral shape, the metal frame material can be bent around the sole in a simple manner so that a special bending technique for it is not necessary. If the shoe is secured to the hoof by gluing, the mounting means to the outer surface of the hoof, the sole is held securely in the vertical direction between the bearing surface segments of the metal frame and the sole of the hoof. The sole member is thus held in the direction of the plane of the sole on projections in an interlocking manner. Thus, a secure connection of the sole with the metal frame results which is not broken by impact or shock loads while running. By virtue of the mutual engagement of the sole and the metal frame, these components compliment each other as regards resistance to shocks. Both components can yield somewhat and permit physiologically important movements of the hoof. However, the structure always returns to its original configuration and ensures firm seating of the hoof. Tearing away of the glued mounting means from the hoof is reliably avoided since the metal frame with its exterior wall projecting laterally beyond the external surface of the hoof is in reliable interlocking contact with the hoof in the direction of the plane of the sole. Lateral movements of the shoe with respect to the hoof which could lead to the former tearing away are thus avoided. The structure in accordance with the invention is particularly characterized by the fact that it can be produced on the spot with the simplest means, using a hammer and knife, from semi-finished products (a long section of metal frame material and a plastic plate) without requiring the use of complex fabrication devices such as plastic molding devices and molds.

Advantageously, projections extending upwardly from the support segments engage snugly in recesses in the sole member. With this, the projections are enclosed on all sides so that the sole member and metal frame are restrained against relative movements in all directions including lateral movement as well as rotational movement so that the stability of the shape of the horseshoe to the desired individual hoof sole shape in ensured.

A construction in which the projections are formed as upwardly extending pegs in recesses which are perpendicular bores is also advantageous. This construction is particularly simple because the pegs can be prefabricated on the metal frame or can be formed as screws threadedly engaging the bearing surface segments. The bores in the sole member can also be applied very simply at the position necessary for any individual hoof shape.

A structure having the self-cutting points on the upper ends of the projection is also advantageous because the assembly can be accomplished with unprepared sole material. Special recesses need not be provided. The sole is simply laid on the metal frame and pressed downwardly so that the projections penetrate into the sole. Forming the pointed projections with arrow-like barbs is also advantageous in that the sole is firmly retained in the vertical direction and assembly is quite simple.

Finally, the sole member constructed with an open center, using the U-shape periphery and a transverse closing bar is desirable because the inner portion of the hoof is substantially free so that it is easily accessible and can dry out. The transverse bar constitutes the necessary closing of the annular structure so that the rear ends do not tend to spread apart while running.

While certain advantageous embodiments have been chosen to illustrate the invention, it will be understood by those skilled in the art that various changes and modifications can be made therein without departing from the scope of the invention as defined in the appended claims.

What I claim is:

1. A horseshoe comprising
   a formable frame having an upstanding outer wall and laterally inwardly extending support surface segments, said frame being bendable into a U-shape to conform to the peripheral shape of the sole of a horse's hoof with said outer wall partially surrounding said hoof and said support segments lying beneath said hoof such that, in use, the outer surfaces of said segments contact the ground;
   a preformed sole member formed from a plate of polymeric material, the periphery of said sole member being shaped to match the peripheral shape of the sole of said hoof;
   a plurality of attachment means connected to said outer wall, said attachment means being attachable to said hoof for securing said frame to said hoof; and
   a plurality of projections extending upwardly from said support segments a distance no greater than the thickness of said sole member and being fixedly attached to said support segments, each of said projections being generally parallel with an adjacent portion of said upstanding outer wall and being spaced from said wall by a predetermined distance, said sole member being attached to said frame within said outer wall and in lateral contact with said projections with at least a part of said sole member lying within a space between said projections and said outer wall so that the sole of said hoof rests on said sole member within said outer wall and firmly engages said sole member between the sole of said hoof and said support segments, the upper edge of said wall being above the upper surface of said sole member.

2. A horseshoe according to claim 1 wherein said sole member includes recesses formed therein to snugly receive said projections whereby lateral relative movement between said frame and said sole member is substantially prevented.

3. A horseshoe according to claim 2 wherein each of said projections comprises a vertical peg and each of said recesses comprises a vertical bore.

4. A horseshoe according to claim 1 wherein each of said projections comprises an upwardly extending member having a pointed distal end for piercing the material of said sole member.

5. A horseshoe according to claim 1 wherein each said support segment includes a threaded opening and wherein each said projection comprises a threaded fastener extending through said sole member and into one of said threaded openings.

6. A horseshoe according to claim 1 wherein said sole member comprises a generally U-shaped body having a web of material bridging the arms of the U near the open end thereof.

7. A horseshoe according to claim 1 wherein said plate of polymeric material is polyurethane having a thickness of between about 10mm and about 20mm.

8. A method of forming and applying a horseshoe comprising the steps of
providing an elongated section of interconnected, unitarily formed frame segments each of which has an upstanding wall portion, a support portion forming an L shape with the wall portion and an upward projection attached to each support portion and extending in parallel, spaced relationship with the wall portion, and a length of flexible material attached to and extending upwardly from the wall portion,
cutting a selected number of frame segments, still connected, from the section so that the length of the segments is substantially equal to the peripheral length of front and side portions of the hoof of a horse,
bending the connected segments to form a frame which substantially conforms to the hoof periphery with the support portions extending inwardly beneath the hoof,
providing a plate of substantially rigid polymeric material,
cutting from that plate a sole member having a peripheral shape which substantially matches the shape of the sole of the hoof,
placing the sole member in the frame and forcing the sole member toward the support portions so that the projections penetrate into the sole member,
placing the hoof into the frame on the sole member, and
adhering the lengths of flexible material to the front and side surfaces of the hoof above the frame.

9. A method according to claim 8 wherein each support portion includes an upward projection with a pointed upper end, and wherein the step of forcing the sole member toward the support portions includes
driving the sole member onto the pointed projections.

10. A method according to claim 9 and including forming the plate of polymeric material from polyurethane having a thickness of between about 10 mm and 20 mm.

11. A method according to claim 8 and including forming the plate of polymeric material from polyurethane having a thickness of between about 10 mm and 20 mm.

12. A method according to claim 8 wherein the wall portions extend upwardly beyond the sole member and the sole of the hoof, comprising the steps of bending the upper portions of each wall portion inwardly toward the hoof.

* * * * *